(12) United States Patent
Zhang et al.

(10) Patent No.: US 10,516,253 B2
(45) Date of Patent: Dec. 24, 2019

(54) EXPANDABLE BUSED SPACER FOR CONNECTING MODULAR METERING EQUIPMENT

(71) Applicant: Siemens Industry, Inc., Alpharetta, GA (US)

(72) Inventors: Fan Zhang, Suwanee, GA (US); Brian J. Rusch, Suwanee, GA (US); Carey D. Harnois, Grayson, GA (US); Arthur Kevin Shumate, Duluth, GA (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 0 days.

(21) Appl. No.: 15/864,688

(22) Filed: Jan. 8, 2018

(65) Prior Publication Data

US 2019/0214797 A1 Jul. 11, 2019

(51) Int. Cl.
*H02B 1/01* (2006.01)
*H02B 1/40* (2006.01)
*H02B 1/03* (2006.01)

(52) U.S. Cl.
CPC .............. *H02B 1/012* (2013.01); *H02B 1/03* (2013.01); *H02B 1/40* (2013.01)

(58) Field of Classification Search
CPC ....... H01L 2224/48472; H01L 31/0201; H01L 31/048; H01L 31/049; H01L 2924/181; H02B 1/20; H02B 1/21; H02B 1/22; H02B 5/06; H02B 13/0352; H02B 1/26; H02B 13/035; H02B 13/045; H02B 13/025; H02B 1/01; H02B 1/03; H02B 1/40; H02B 1/565
See application file for complete search history.

(56) References Cited

U.S. PATENT DOCUMENTS

| | | | | |
|---|---|---|---|---|
| 9,558,864 | B2 * | 1/2017 | Kaishian | H02G 5/025 |
| 2011/0000922 | A1 * | 1/2011 | Barz | H02B 13/045 220/581 |
| 2011/0083872 | A1 * | 4/2011 | Zhang | H02G 5/025 174/50 |
| 2012/0014039 | A1 * | 1/2012 | Keegan | H05K 7/1432 361/601 |
| 2013/0140080 | A1 * | 6/2013 | Davila | H02G 3/086 174/563 |
| 2014/0060881 | A1 * | 3/2014 | Rautenberg | H02B 13/045 174/69 |

* cited by examiner

*Primary Examiner* — Adam B Dravininkas

(57) ABSTRACT

An expandable bused spacer is provided for installing modular metering equipment such as in an electrical room of a high rise building. The expandable bused spacer comprises an enclosure configured to fit in a gap between modular equipment and a bussed interior assembly enclosed within the enclosure. The enclosure has a box assembly with a sliding mechanism that enables expansion of the box assembly. The bussed interior assembly has a bussing expansion mechanism that enables expansion of the bussed interior assembly. An expandable bused elbow for connecting modular metering equipment around an inside corner is also provided.

9 Claims, 15 Drawing Sheets

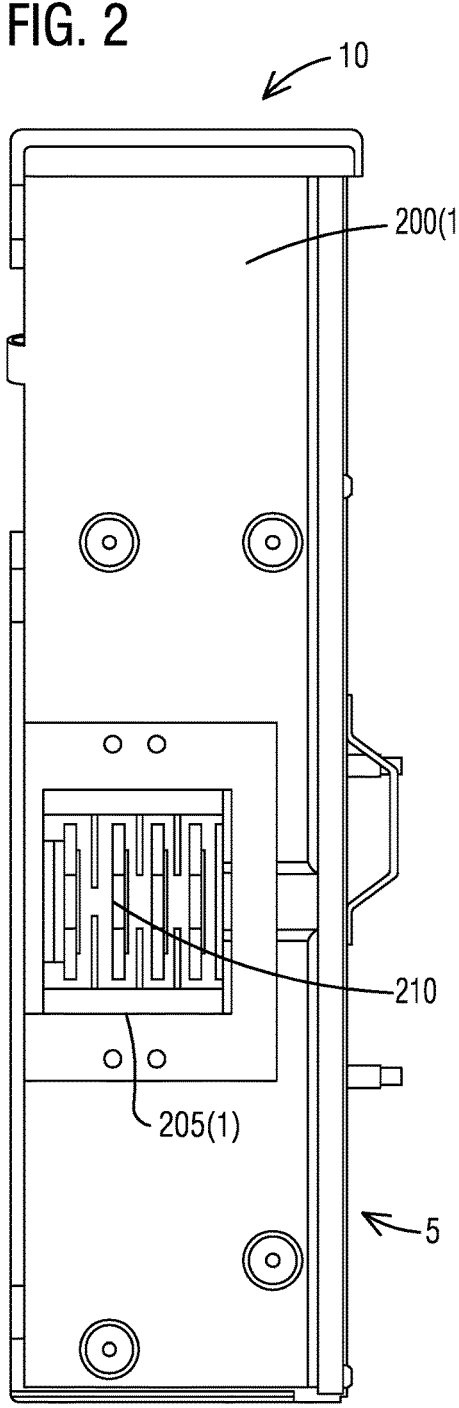
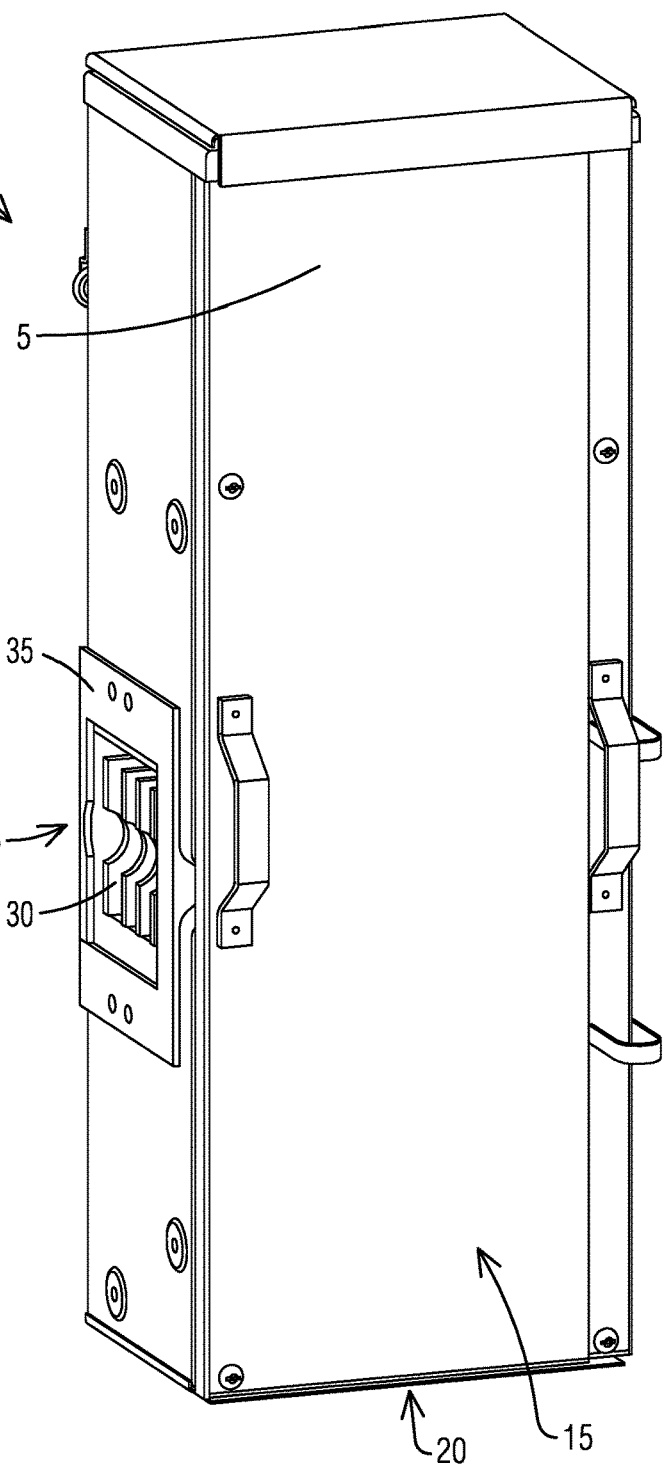

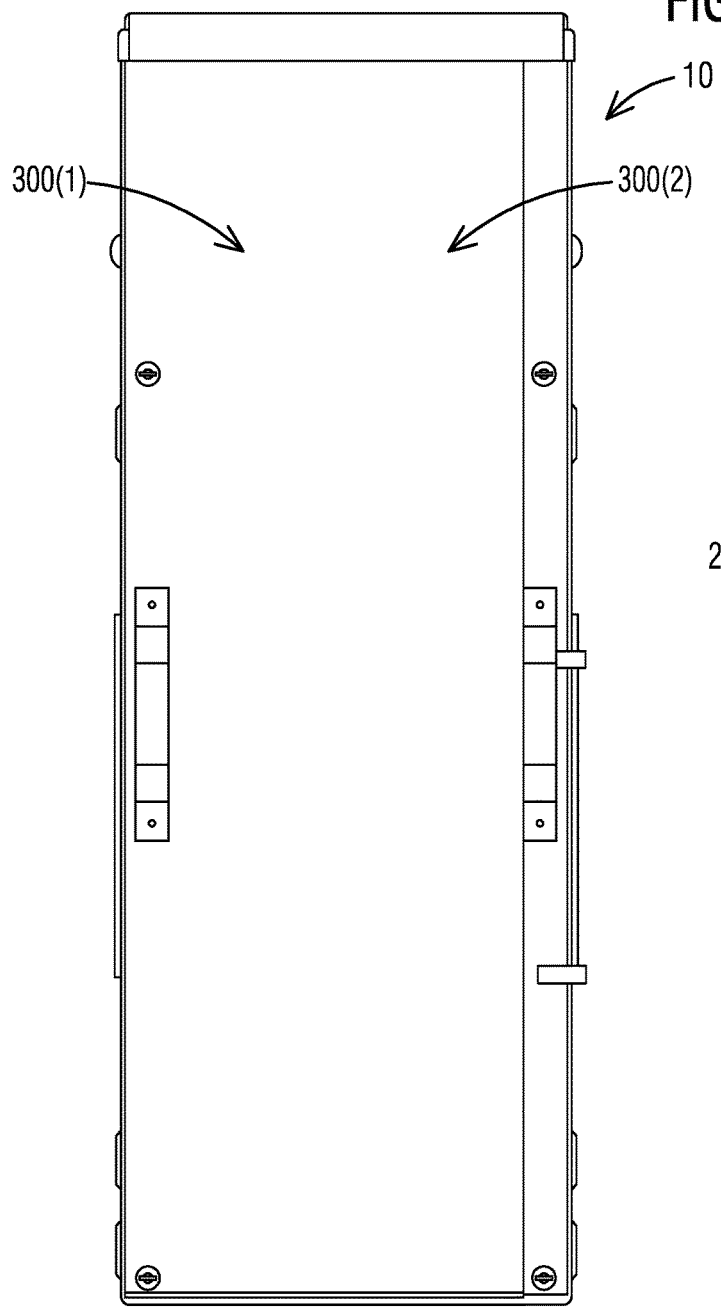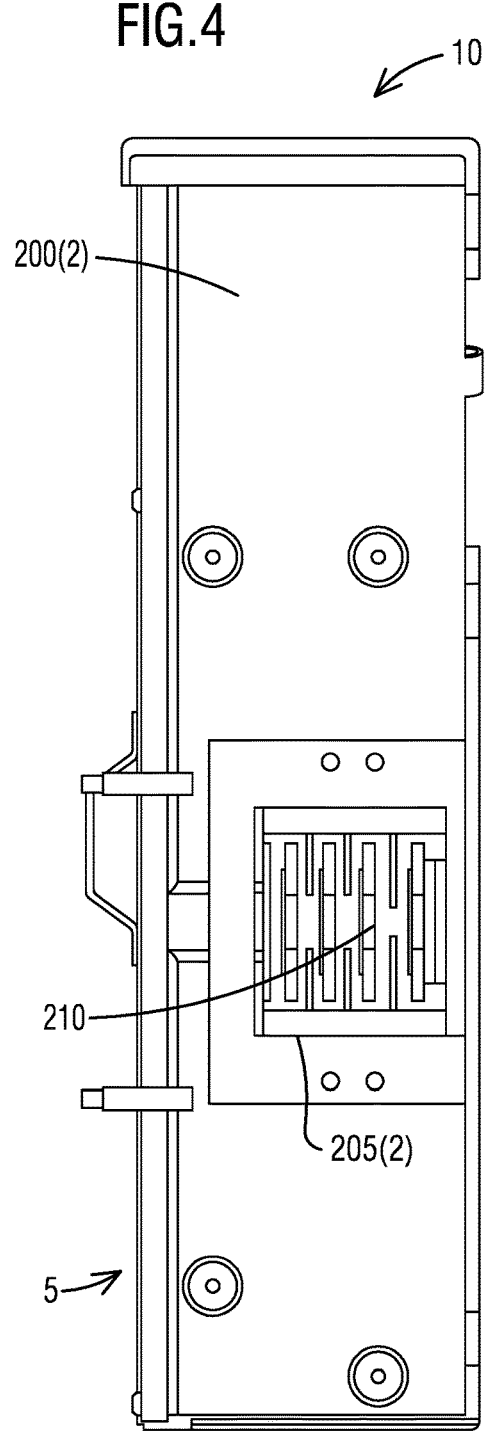

EXPANDABLE BUSED SPACER FOR CONNECTING MODULAR METERING EQUIPMENT

BACKGROUND

1. Field

Aspects of the present invention generally relate to an expandable bused spacer for modular metering and an expandable bused elbow for connecting modular metering equipment around an inside corner.

2. Description of the Related Art

Modular Metering Equipment installations normally include multiple electrical modules. These electrical modules need to be joined together correctly with snug electrical connections, leaving little forgiveness for building variations, especially when involving bused elbows that require at least 3 more inches extra installation space while the whole installation space still needs to be occupied after the final installation. Therefore, a suitable bused spacer or bused elbow is desired, which can be smaller enough to fit in tight space and yet be capable of making electrical connections.

When installing Modular Metering Equipment in an electrical room, especially in mid rise and high rise buildings that may involve bus way or riser cables, electricians often struggle to fit all Modular Metering Equipment. This can be complicated further when the equipment needs to go around inside or outside corners. The equipment doesn't always line up perfectly. Tolerances of manufactured products can be fairly well controlled. But construction tolerances of buildings can vary, making the joining of all modules a challenge. This can be more challenging when each module needs additional two or three inches installation space to lie in an additional module, when the modules are connected. The Modular Metering Equipment has to be joined together correctly with snug electrical connections, leaving little forgiveness for issues that can be seen on a job site.

Some electricians cut an opening in the wall to make space for installing modular metering equipment and then patch the wall back after the installation. It may however cause problems for a rework situation or a replace situation of an electrical module. Some electricians leave the mains or busway loose and forcibly twist the enclosures to make installation space.

Therefore, there is a need for a suitable bused spacer or a bused elbow which can be smaller enough in size to fit in a tight space and yet be capable of making desired electrical connections.

SUMMARY

Briefly described, aspects of the present invention relate to expandable modular metering spacer and elbow that can be fitted in tight installation space and be expanded for making electrical connections.

Embodiments of this invention provide an adjustable width electrical module for modular metering market. The internal bus connections in an expandable modular metering bused spacer and elbow enable a cross bus to be expanded smoothly within designated limits, which provides more forgiveness for tolerating construction variation and proves more flexible in designing an electrical room. The expandable modular metering bused spacer and elbow can also lend to an easy installation and thus save installation time.

In accordance with one illustrative embodiment of the present invention, an expandable bused spacer is provided for modular metering. The expandable bused spacer comprises an enclosure configured to fit in a gap between modular equipment and a bussed interior assembly enclosed within the enclosure. The enclosure has a box assembly with a sliding mechanism that enables expansion of the box assembly. The bussed interior assembly has a bussing expansion mechanism that enables expansion of the bussed interior assembly.

In accordance with another illustrative embodiment of the present invention, an expandable bused elbow is provided for connecting modular metering equipment around an inside corner. The expandable bused elbow comprises an enclosure configured to fit in a gap between modular equipment. The enclosure has a box assembly with a sliding mechanism that enables expansion of the box assembly. The expandable bused elbow further comprises a first bussed interior assembly enclosed within the enclosure having a first bottom end. The first bussed interior assembly has a first bussing expansion mechanism that enables expansion of the first bussed interior assembly. The expandable bused elbow further comprises a second bussed interior assembly enclosed within the enclosure having a second bottom end. The second bussed interior assembly has a second bussing expansion mechanism that enables expansion of the second bussed interior assembly. The expandable bused elbow further comprises a center corner assembly disposed in a middle space between the first bussed interior assembly and the second bussed interior assembly such that the center corner assembly is coupled to the first bottom end of the first bussed interior assembly on one end and to the second bottom end of the second bussed interior assembly on other end.

BRIEF DESCRIPTION OF THE DRAWINGS

FIG. 1 illustrates a perspective view of an enclosure of an expandable bused spacer for modular metering in accordance with an exemplary embodiment of the present invention.

FIG. 2 illustrates a projection left view of an expandable bused spacer for modular metering in accordance with an exemplary embodiment of the present invention.

FIG. 3 illustrates a projection front view of an expandable bused spacer for modular metering in accordance with an exemplary embodiment of the present invention.

FIG. 4 illustrates a projection right view of an expandable bused spacer for modular metering in accordance with an exemplary embodiment of the present invention.

DETAILED DESCRIPTION

Figure 5:
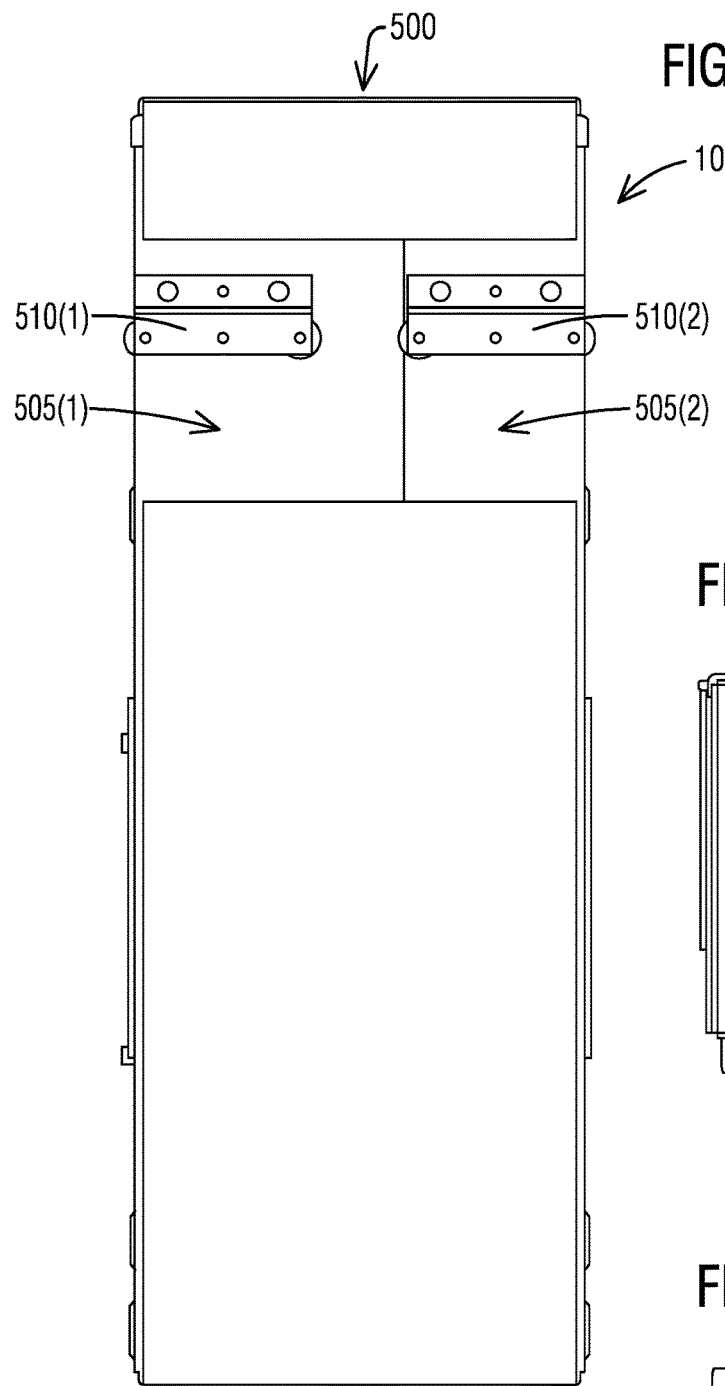
FIG. 5 illustrates a projection back view of an expandable bused spacer for modular metering in accordance with an exemplary embodiment of the present invention.

To facilitate an understanding of embodiments, principles, and features of the present invention, they are explained hereinafter with reference to implementation in illustrative embodiments. In particular, they are described in the context of an expandable bused spacer for modular metering and an expandable bused elbow for connecting modular metering equipment around an inside corner. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

Consistent with one embodiment of the present invention, FIG. 1 represents a perspective view of an enclosure 5 of an expandable bused spacer 10 for modular metering in accordance with an exemplary embodiment of the present invention. The expandable bused spacer 10 comprises the enclosure 5 that is configured to fit in a gap between modular equipment. The enclosure 5 includes a box assembly 15 with a sliding mechanism 20 that enables expansion of the box assembly 15. The expandable bused spacer 10 further comprises a bussed interior assembly 25 enclosed within the enclosure 5. The bussed interior assembly 25 has a bussing expansion mechanism 30 that enables expansion of the bussed interior assembly 25.

The expandable bused spacer 10 has the box assembly 15 and the enclosure 5 as two piece covers and the bussed interior assembly 25. The box assembly 15 has two half assemblies and one middle wrapper. The left half box assembly has one top, one left side and one bottom walls, and the right half box assembly has one top, one right side and one bottom walls. The middle wrapper is attached on the outside of the two half box assemblies and fills the gap when the two half box assemblies when they are slide open. The two covers have an inner cover behind an outer cover that can slide out following the expansion of the enclosure 5. There is one bus opening 35 (only one visible) on each side of the expandable bused spacer 10 to electrically it can connect to a next module and to join with a next enclosure.

FIGS. 2-7 show projection views of an expandable modular spacer, including a front view, a top view, a bottom view, a left view, a right view and a back view. Referring to FIG. 2, it illustrates a projection left view of the expandable bused spacer 10 for modular metering in accordance with an exemplary embodiment of the present invention. FIG. 4 illustrates a projection right view of the expandable bused spacer 10 for modular metering in accordance with an exemplary embodiment of the present invention. The left and right views in FIGS. 2, 4 show sides 200(1-2) of the enclosure 5, respectively. A rectangular opening 205(1-2) on each side exposes a cross bus 210, which are used to electrically connect to adjacent modules on both sides. A plurality of embosses and holes are to mechanically connect the expandable bused spacer 10 to the enclosure 5 of the next module.

Turning now to FIG. 3, it illustrates a projection front view of the expandable bused spacer 10 for modular metering in accordance with an exemplary embodiment of the present invention. The projection front view shows two piece overlaid covers 300(1-2) with handles that are fastened to the enclosure 5.

As seen in FIG. 5, it illustrates a projection back view of the expandable bused spacer 10 for modular metering in accordance with an exemplary embodiment of the present invention. The projection back view shows the back of a middle wrapper 500. At the top portion, the middle wrapper 500 is bent inside first and second half box assemblies 505(1-2) and bent outside near the top end. This offset exposes the back wall of the first and second half box assemblies 505(1-2) where two roller brackets 510(1-2) are installed. The roller brackets 510(1-2) are to hang the expandable bused spacer 10 on a common rail of modular metering equipment. The roller brackets 510(1-2) support the weight of the expandable bused spacer 10 and enable easy adjustment to the width the expandable bused spacer 10.

Figure 6:
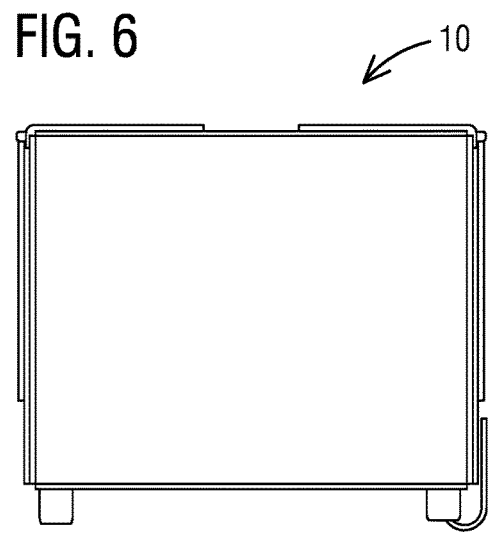
FIG. 6 illustrates a projection top view of an expandable bused spacer for modular metering in accordance with an exemplary embodiment of the present invention.
Figure 7:
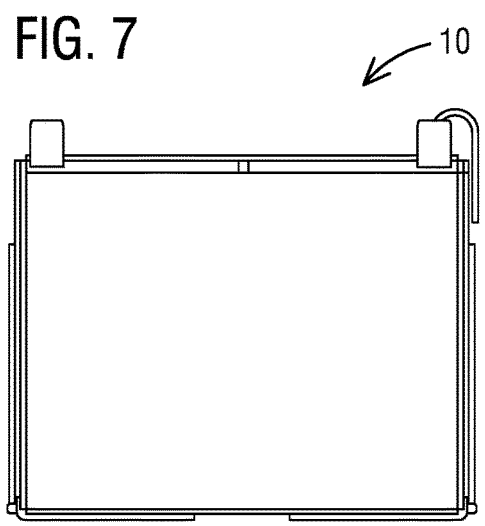
FIG. 7 illustrates a projection bottom view of an expandable bused spacer for modular metering in accordance with an exemplary embodiment of the present invention.

As shown in FIG. 6, it illustrates a projection top view of the expandable bused spacer 10 for modular metering in accordance with an exemplary embodiment of the present invention. In FIG. 7, it illustrates a projection bottom view of the expandable bused spacer 10 for modular metering in accordance with an exemplary embodiment of the present invention. The projection top and bottom views show the blank ends of the middle wrapper 500 that shade over the top and bottom of the left and right half box assemblies 505(1-2).

Figure 8:
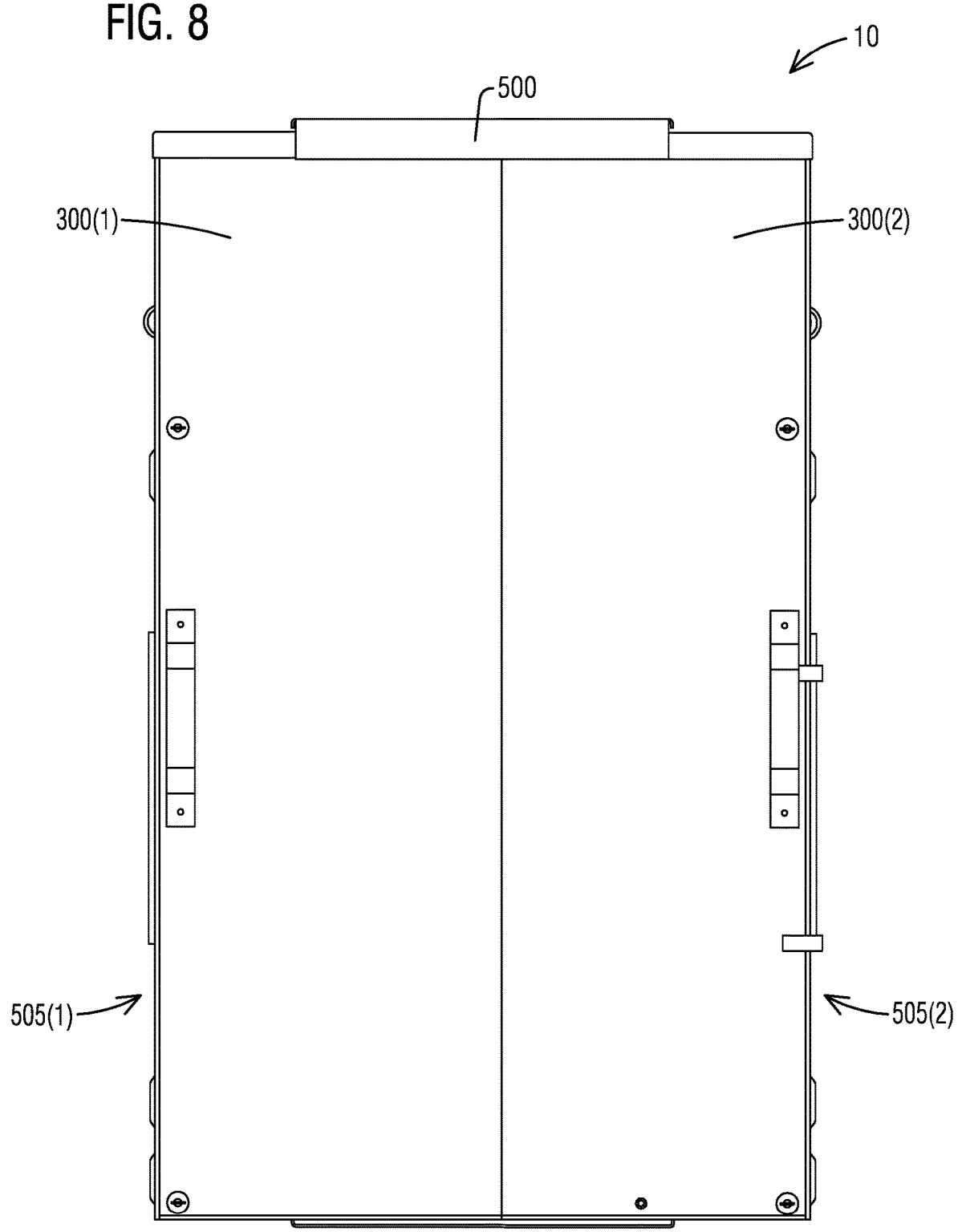
FIG. 8 illustrates a projection front view of expanded an expandable bused spacer for modular metering in accordance with an exemplary embodiment of the present invention.

With regard to FIG. 8, it illustrates a projection front view of expanded the expandable bused spacer 10 in accordance with an exemplary embodiment of the present invention. The expandable bused spacer 10 can expand from 10" wide to 17" maximum, for example. The left and right half box assemblies 505(1-2) slide open to both sides. The middle wrapper 500 stays between the two halves to protect the gap between them. A front box assembly 505 further comprises a first cover 300(1), a second cover 300(2) and the middle wrapper 500 that is disposed over at least a portion of the first cover 300(1) and at least a portion of the second cover 300(2). The middle wrapper 500 slidingly engages with the first cover 300(1) and the second cover 300(2) to slide open or slide close the box assembly 505. The covers 300(1-2) slide outward with the two halves.

Figure 9:
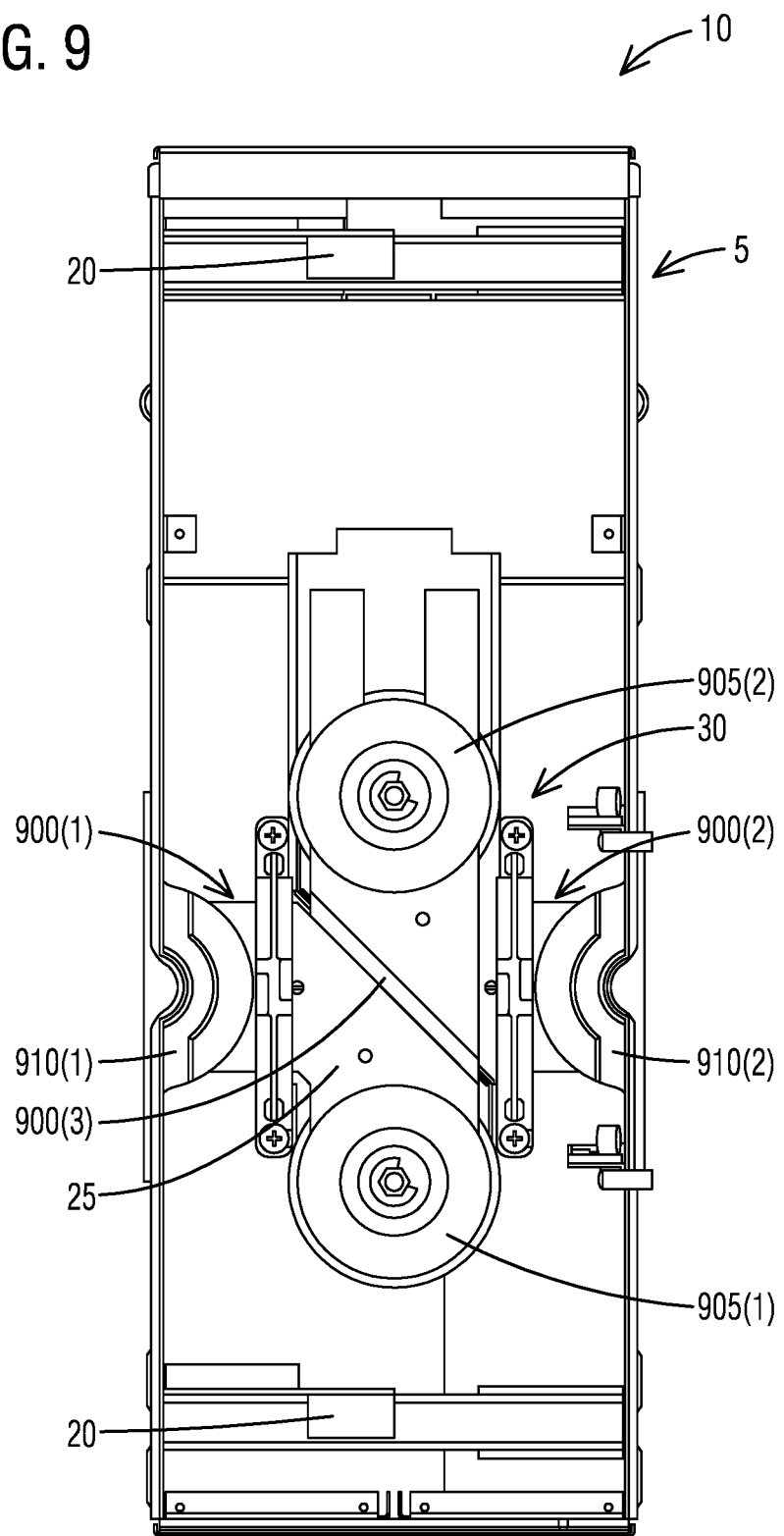
FIG. 9 illustrates a front view of an expandable bused spacer without covers in accordance with an exemplary embodiment of the present invention.

With respect to FIG. 9, it illustrates a front view of the expandable bused spacer 10 without the covers 300(1-2) in accordance with an exemplary embodiment of the present invention. FIG. 9 presents the projection front view of the expandable modular spacer 10 with the covers 300(1-2) removed. The top and bottom portion in the enclosure 5 are the sliding mechanism 20 of the enclosure 5 that enables it's expansion. The center portion in the enclosure 5 is the bussing expansion mechanism 30. At both ends close to the side walls, there are half circle shaped insulators that form a cavity to accept Quick Connect disk couplers for electrical connection to the adjacent modular equipment. Next to the half circle shaped insulators, one pair of cross bus support is on each side, which separates the cross bus to proper electrical spacings. The left and right phase bus bars are symmetrical around the center and the distance between each other is about ¼ inch via a 45 degree angle.

The bussed interior assembly 25 further comprises a left phase bus bar 900(1) disposed between a bottom disk connector 905(1) and a left insulator 910(1). The bussed interior assembly 25 further comprises a right phase bus bar 900(2) disposed between a top disk connector 905(2) and a right insulator 910(2). The bussed interior assembly 25 further comprises a jumper bus bar 900(3) disposed between the bottom disk connector 905(1) and the top disk connector 905(2). The left phase bus bar 900(1) are stacked to a bottom disk connection, while the right phase bus bar 900(2) are stacked to a top disk connection. From the bottom disk connection to the top disk connection, plurals of the phase jumper bus bar 900(3) (4 for 3 phase system and 3 for single phase system) link the bottom disk connection to the top disk connection.

Figure 10:
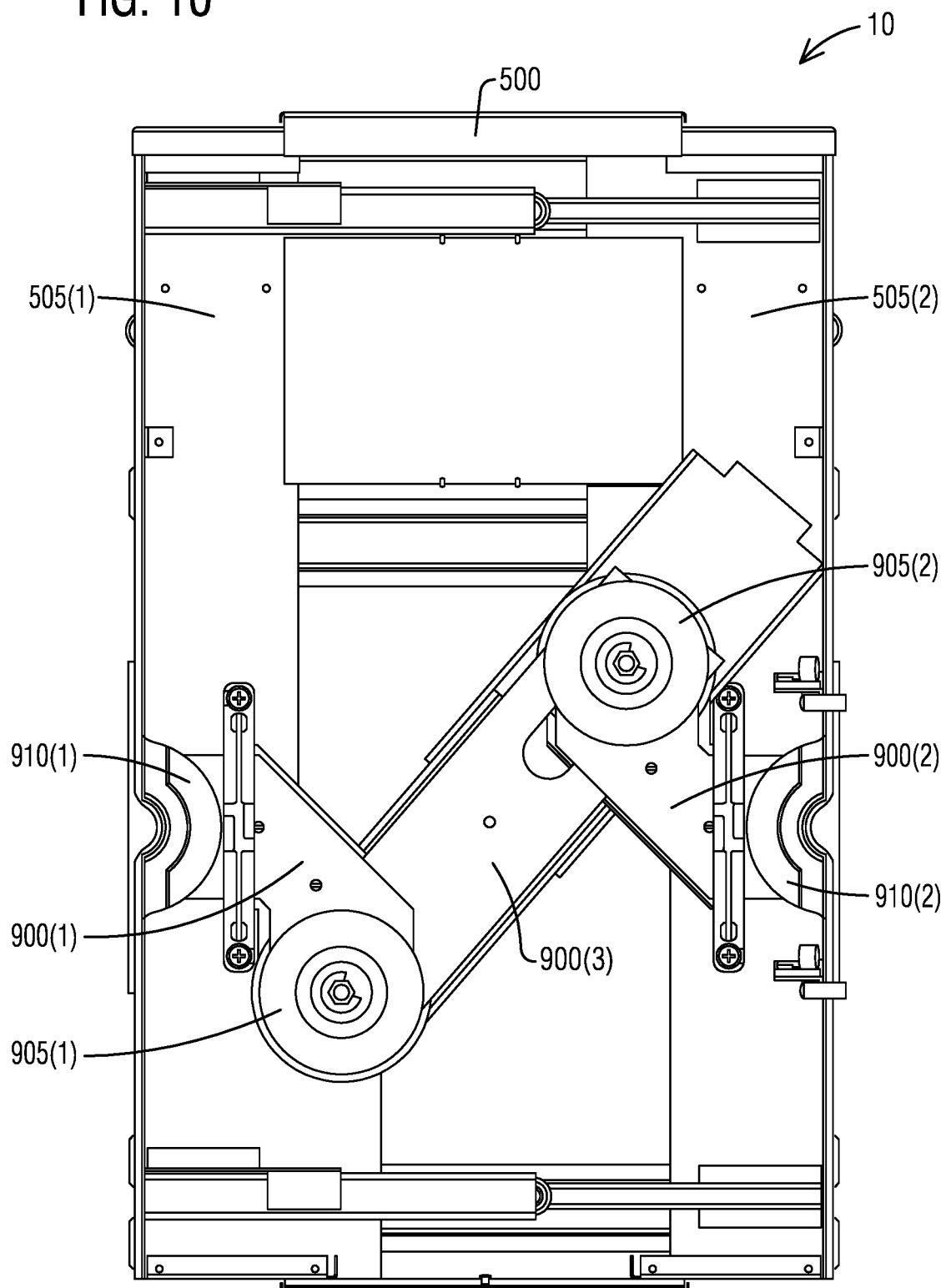
FIG. 10 illustrates a front view of expanded an expandable bused spacer without covers in accordance with an exemplary embodiment of the present invention.

FIG. 10 illustrates a front view of expanded the expandable bused spacer 10 without the covers 300(1-2) in accordance with an exemplary embodiment of the present invention. FIG. 10 shows the interior of the expanded expandable bused spacer 10. The left phase bus bar 900(1), the left half circle shaped insulator 910(1), the left cross bus supports and the bottom disk connector 905(1) are mounted on the left box assembly 505(1). The right phase bus bar 900(2), the right half circle shaped insulator 910(2), the right cross bus supports and the top disk connector 905(2) are mounted on the right box assembly 505(2). The phase jumpers of the jumper bus bar 900(3) are stacked by connecting to designated phase bus at the bottom disk connector 905(1). The phase jumpers pivot at the bottom disk connector 905(1) and slide at the top disk connector 905(2). When the top and bottom disk connections are loosened, and the left and right box assemblies 505(1-2) are slid apart, the bus jumpers pivot at the bottom disk connection while the bus jumpers pivot and slide at the top disk connection.

Figure 11:
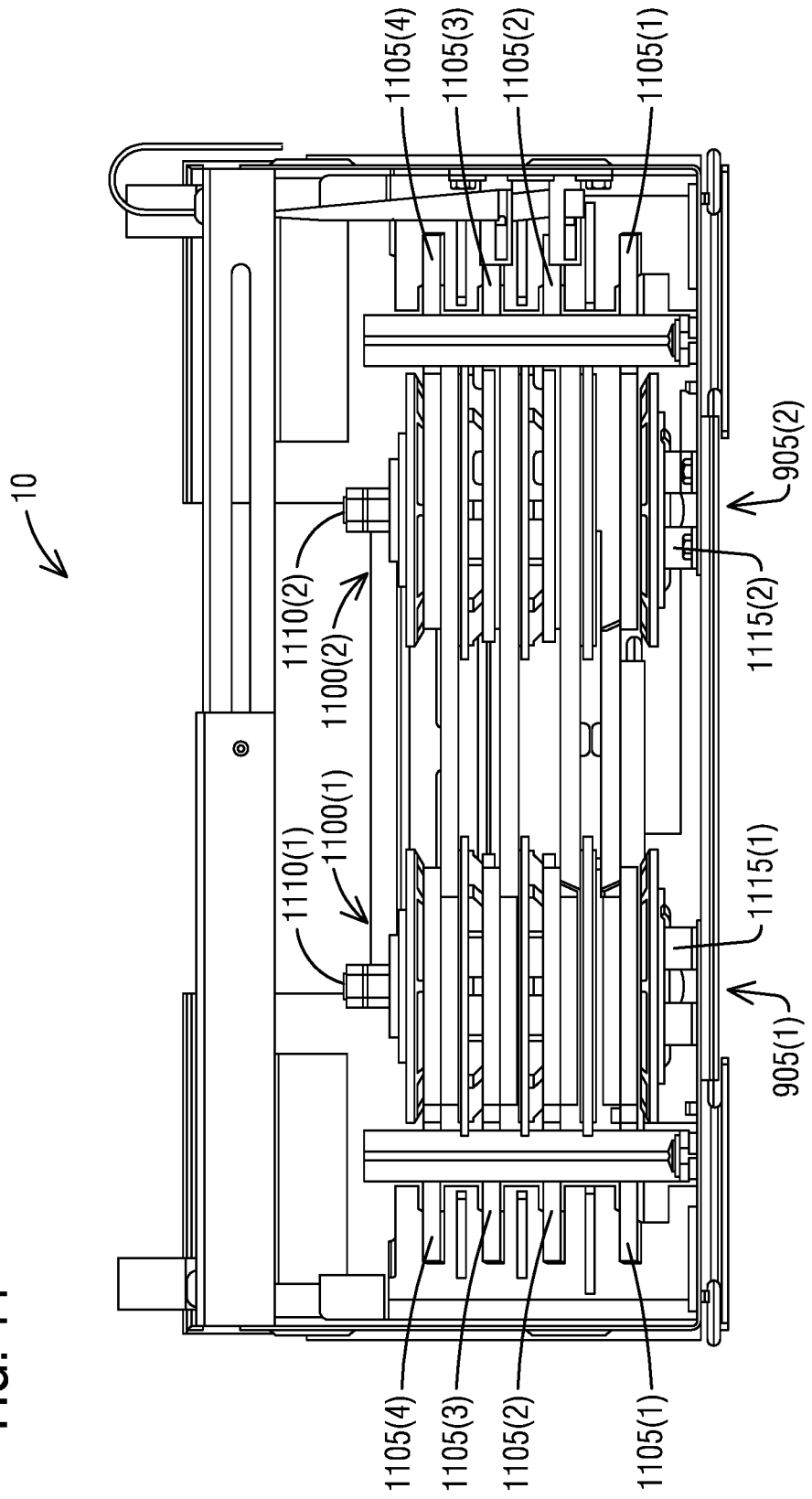
FIG. 11 illustrates a bottom view of expanded spacer an expandable bused spacer with bottom endwalls removed in accordance with an exemplary embodiment of the present invention.

FIG. 11 illustrates a bottom view of expanded the expandable bused spacer 10 with bottom endwalls removed in accordance with an exemplary embodiment of the present invention. The bottom disk connection is on the left, while the top disk connection is on the right. The phase busses are stacked at the disk connections. From front to back, they are sequenced A, N, B and C phases. The disk connections include a stack of insulated disks that separate phase bus.

The bottom disk connector 905(1) further comprises a first stack of insulator disks 1100(1) holding a C bus 1105(1), a B bus 1105(2), a N bus 1105(3) and an A bus 1105(4) with a first carriage bolt 1110(1) and a first pair of brackets 1115(1). Likewise, the top disk connector 905(2) further comprises a second stack of insulator disks 1100(2) holding the C bus 1105(1), the B bus 1105(2), the N bus 1105(3) and the A bus 1105(4) with a second carriage bolt 1110(2) and a second pair of brackets 1115(2).

The insulated disks 1100(1-2) are pressed together by a carriage bolt 1110(1-2) through the center of the disks. The head of the carriage bolt 1110(1-2) is held by two brackets 1115(1-2) that are mounted to the back wall of the enclosure 5. Each phase jumper is directly mated to its designated phase bus in the disk connections. The insulated disks 1100(1-2) are stacked between any two phase bus. There are plurals of insulators on N, B and C phase bus and on B and C phase to shield the bus electrically where through air or over surface spacing is not adequate.

Figure 12:
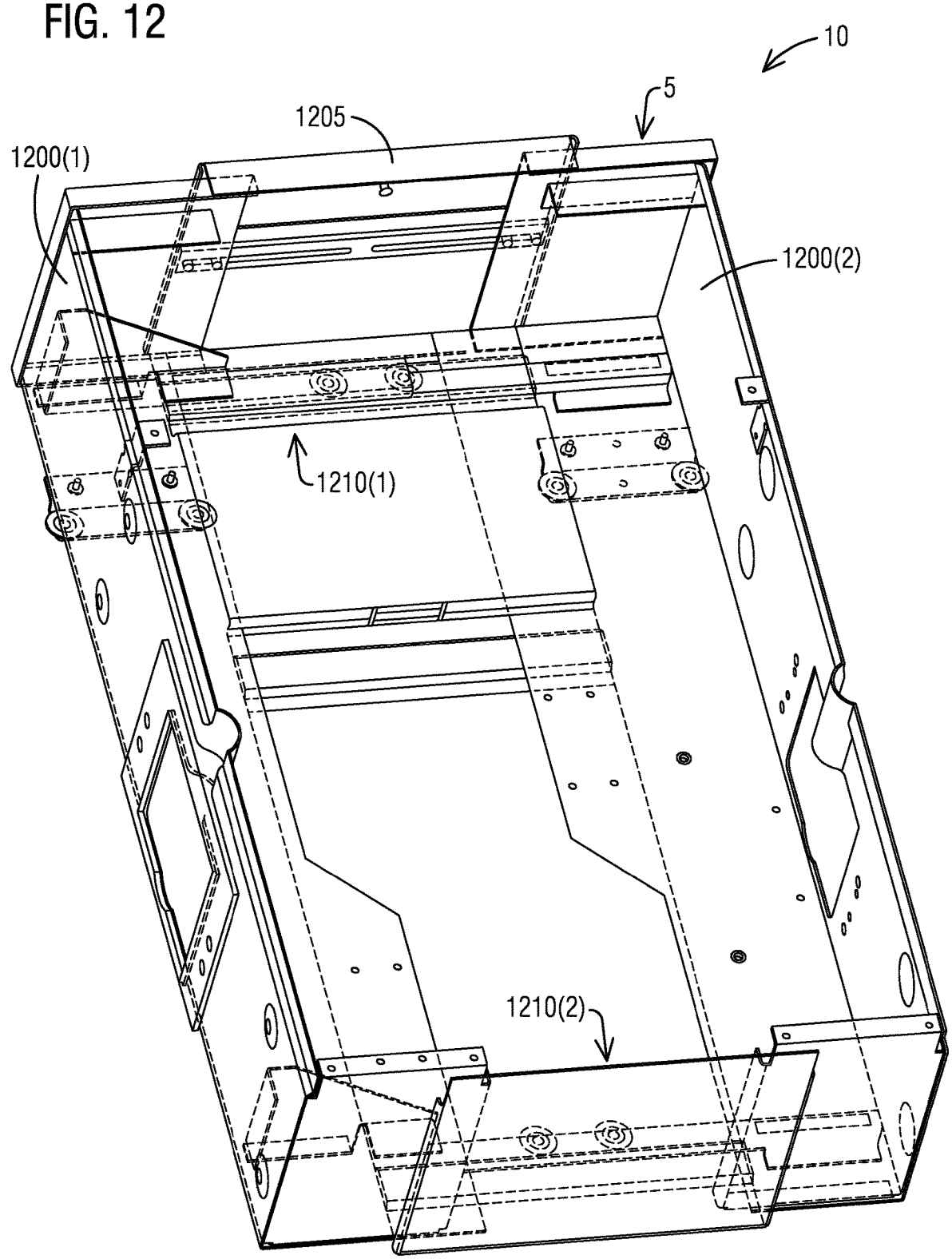
FIG. 12 illustrates a perspective view of a box assembly of expanded an expandable bused spacer in accordance with an exemplary embodiment of the present invention.

FIG. 12 illustrates a perspective view of the box assembly 15 of an expanded expandable bused spacer 10 in accordance with an exemplary embodiment of the present invention. The box assembly 15 comprises a left half box assembly 1200(1), a middle wrapper 1205 and a right half box assembly 1200(2). There are two sliding mechanisms 1210(1-2) mounted on top and bottom of the left and right half box assemblies 1200(1-2), to enable each side to slide seamlessly. The middle wrapper 1205 has a bottom side, a top side and a back side. The bottom and top sides are installed outside of the left and right half box assemblies 1200(1-2). There is a slotted bracket installed between the top side of the middle wrapper 1205 and the top endwalls of the left and right half box assemblies 1200(1-2). The bracket has two oblong slots. Two shoulder rivets mounted on each of the top endwalls of the left and right half box assemblies 1200(1-2) fasten into the slots and slide along the slots. The two rivets define the closest and furthest points the half box assemblies can slide relative to the middle wrapper 1205, hence the two rivets and the slots they slide in define the width limits of the entire assembly. The same slotted bracket and rivet combinations are installed between the bottom side of the middle wrapper 1205 and the bottom endwalls of the left and right half box assemblies 1200(1-2) to maintain stability when the half box assemblies 1200(1-2) slide. Mounting on the back of the left and right half box assemblies 1200(1-2), the two sliding mechanisms 1210(1-2) are deployed at the top and bottom portion. The back of the middle wrapper 1205 is overlaid outside of the back of the left and right half box assemblies 1210(1-2). Towards the top, the back of the middle wrapper 1205 is formed inside the back of the left and right half box assemblies 1210(1-2) through two pairs of clearance slots. These offsets enable the back of the left and right half box assemblies 1210(1-2) to mount the roller brackets, which are used to hang and glide on modular metering equipment hanging rails, and holding the weight of the expandable bused spacer 10. There are two brackets mounted between outer back wall of the left and right half box assemblies 1210(1-2) and inner back wall of the middle wrapper 1205 to maintain the spacing between the middle wrapper 1205 and the left and right half box assemblies 1210(1-2), and in order to clear the screw heads when the box assemblies slide.

Figure 13:
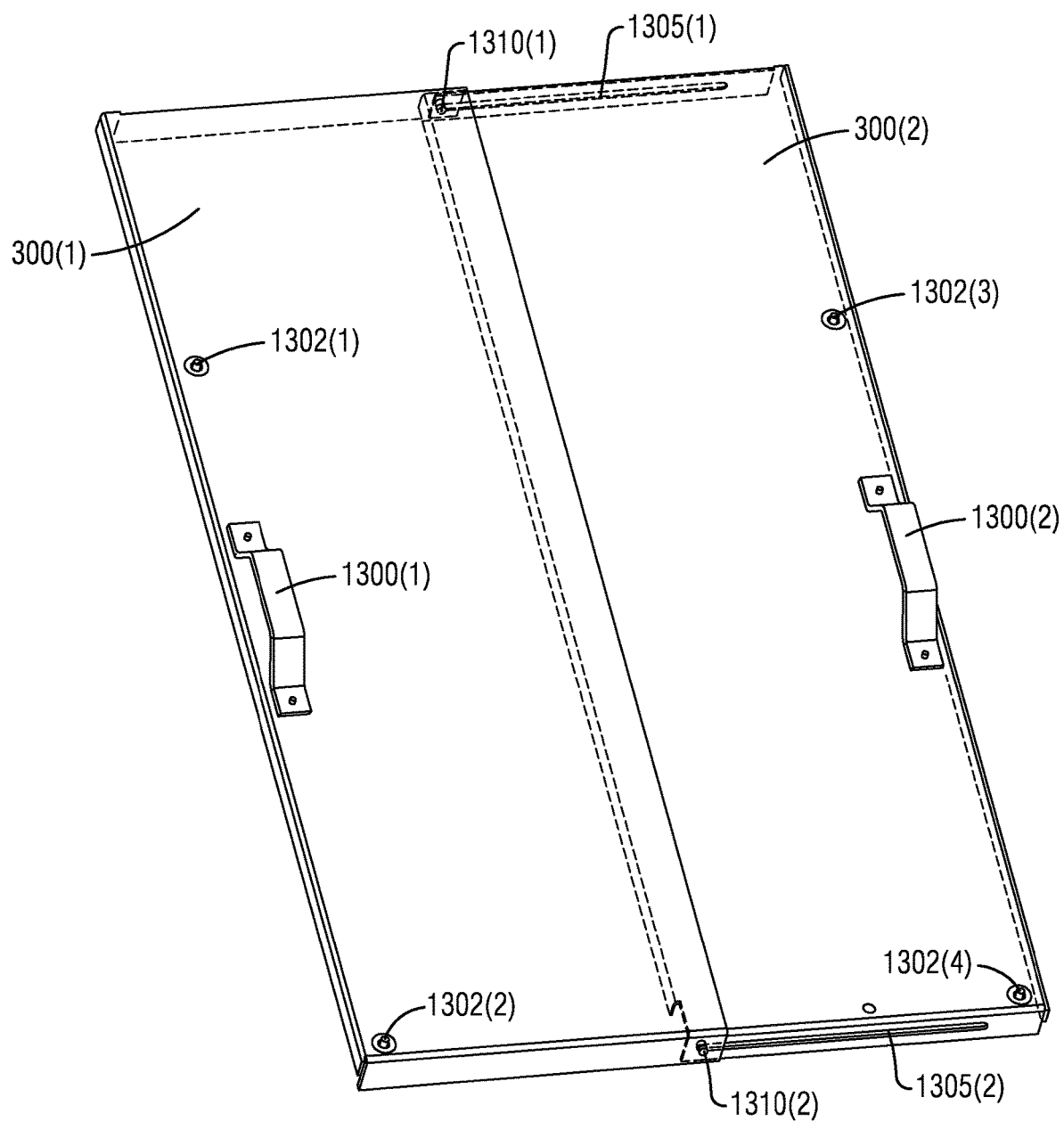
FIG. 13 illustrates the expanded covers in accordance with an exemplary embodiment of the present invention.

FIG. 13 illustrates a perspective view of the expanded covers 300(1-2) in accordance with an exemplary embodiment of the present invention. One handle 1300(1-2) each is installed on outer edge of each cover 300(1-2) for easy handling. Two mounting screws 1302(1-4) on each cover are to secure the covers 300(1-2) to the enclosure 5. A front cover 300(1) overlays on top of a back cover 300(2). The covers 300(1-2) have larger flanges on the top and bottom sides of the covers 300(1-2). There are slots 1305(1-2) on the top and bottom sides of the back cover 300(2). A shoulder rivet 1310(1-2) is installed on the top and bottom flange of the front cover 300(1) through the slot on the back cover 300(2). The position and length of the slots 1305(1-2) define the width limits the covers 300(1-2) can be adjusted to.

Figure 14:
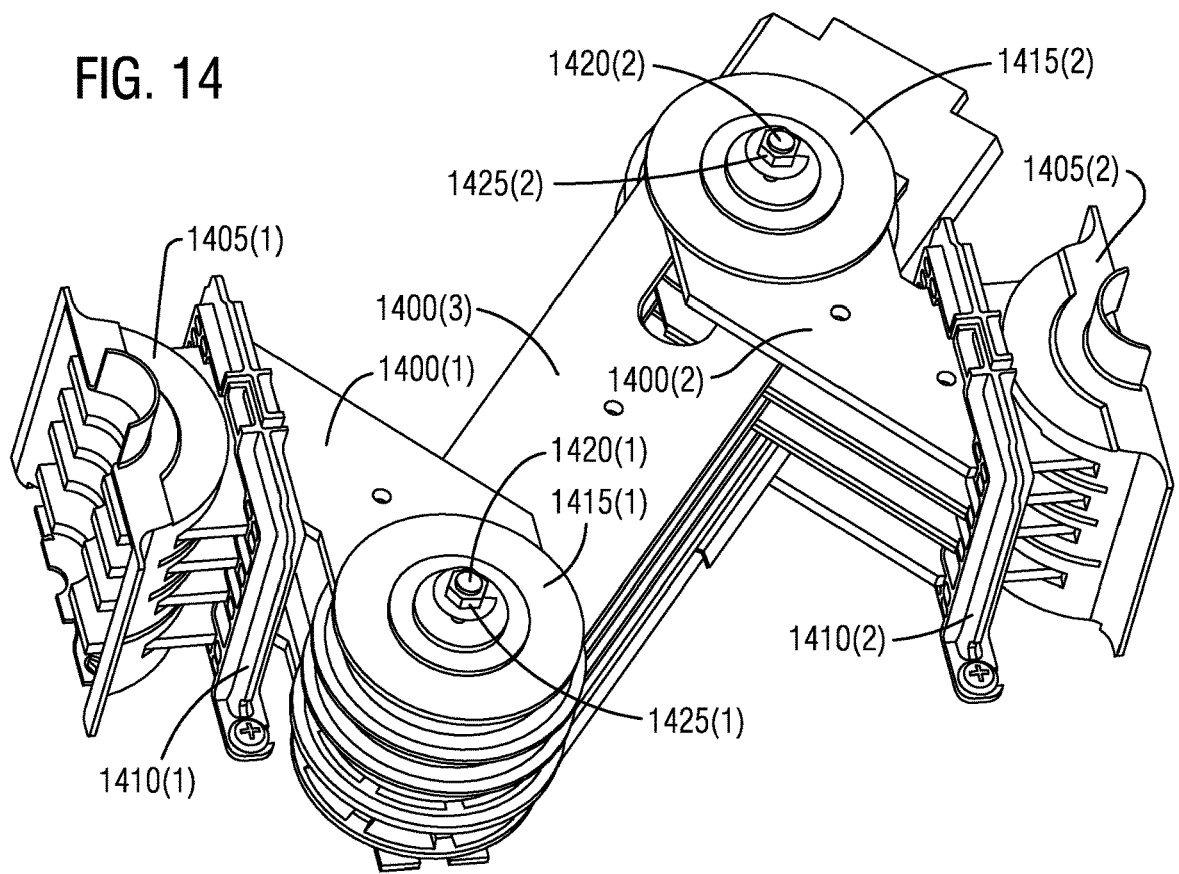
FIG. 14 illustrates the interior of expanded an expandable bused spacer in accordance with an exemplary embodiment of the present invention.

FIG. 14 illustrates the interior of an expanded expandable bused spacer 10 in accordance with an exemplary embodiment of the present invention. FIG. 14 shows the bus connections of the expandable bused spacer 10. A left phase bus bars 1400(1), showing A, N, B, and C phase from front to back, are properly spaced by a half circle shaped insulator 1405(1) and a left cross bus support 1410(1), and mate up to a bottom disk connection 1415(1). They are statically mounted to the left half box assembly (not shown) 1210(1). A right phase bus bars 1400(2) are mounted in the same fashion on the right half box assembly (not shown) 1210(2). The left and right phase bus bars 1400(1-2) can be moved apart or closer on a horizontal center line with the left and right box assemblies 1210(1-2). The phase jumpers of a jumper bus bars 1400(3) are stacked bus bars that make electrical contact to their corresponding phase bus on the bottom disk connection 1415(1). The other end of the phase jumpers mate up to a top disk connection 1415(2) to make electrical contact with the right phase bus bars 1400(2). The phase jumpers of the jumper bus bars 1400(3) have slots that enable the bus jumper to slide. In the top and bottom disk connections 1415(2, 1), there are disk insulators on top, bottom, and between the bus where needed to supplement through air and over surface electrical spacing. A carriage bolt 1420(1-2) through the center of the disks is provided and a nut 1425(1-2) on top the disks is used to loosen the joint when making adjustments. The nut 1425(1-2) is to be tightened when expanded joint is set to its permanent position to ensure proper electrical connections are maintained when the expandable bused spacer 10 is in service.

Figure 15:
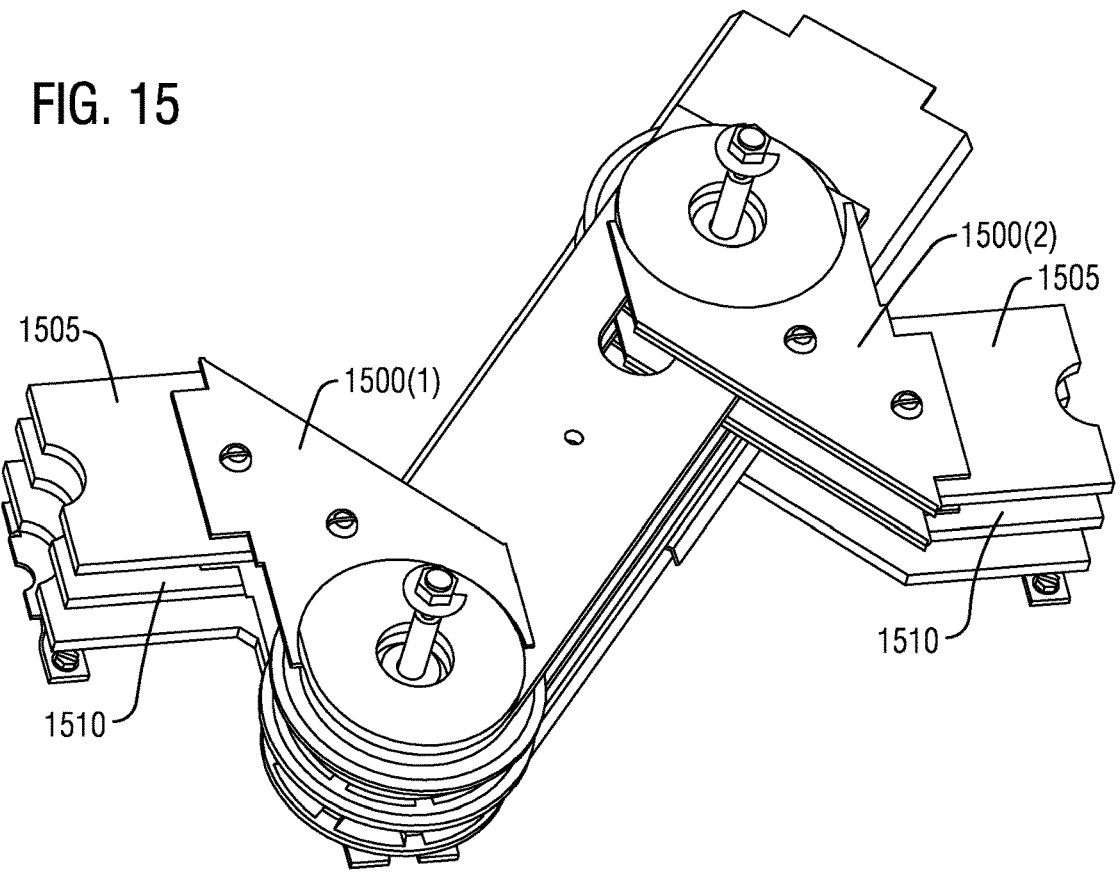
FIG. 15 illustrates the interior bus connections with A phase bus removed in accordance with an exemplary embodiment of the present invention.

FIG. 15 illustrates the interior bus connections with an A phase bus removed in accordance with an exemplary embodiment of the present invention. An insulator 1500(1) is mounted on a left Neutral (N) bus 1505 with two plastic screws. Same insulator 1500(1) is mounted on a left B phase bus 1510 and an insulator 1500(2) is mounted on the right side N and B phase bus 1505, 1510.

Figure 16:
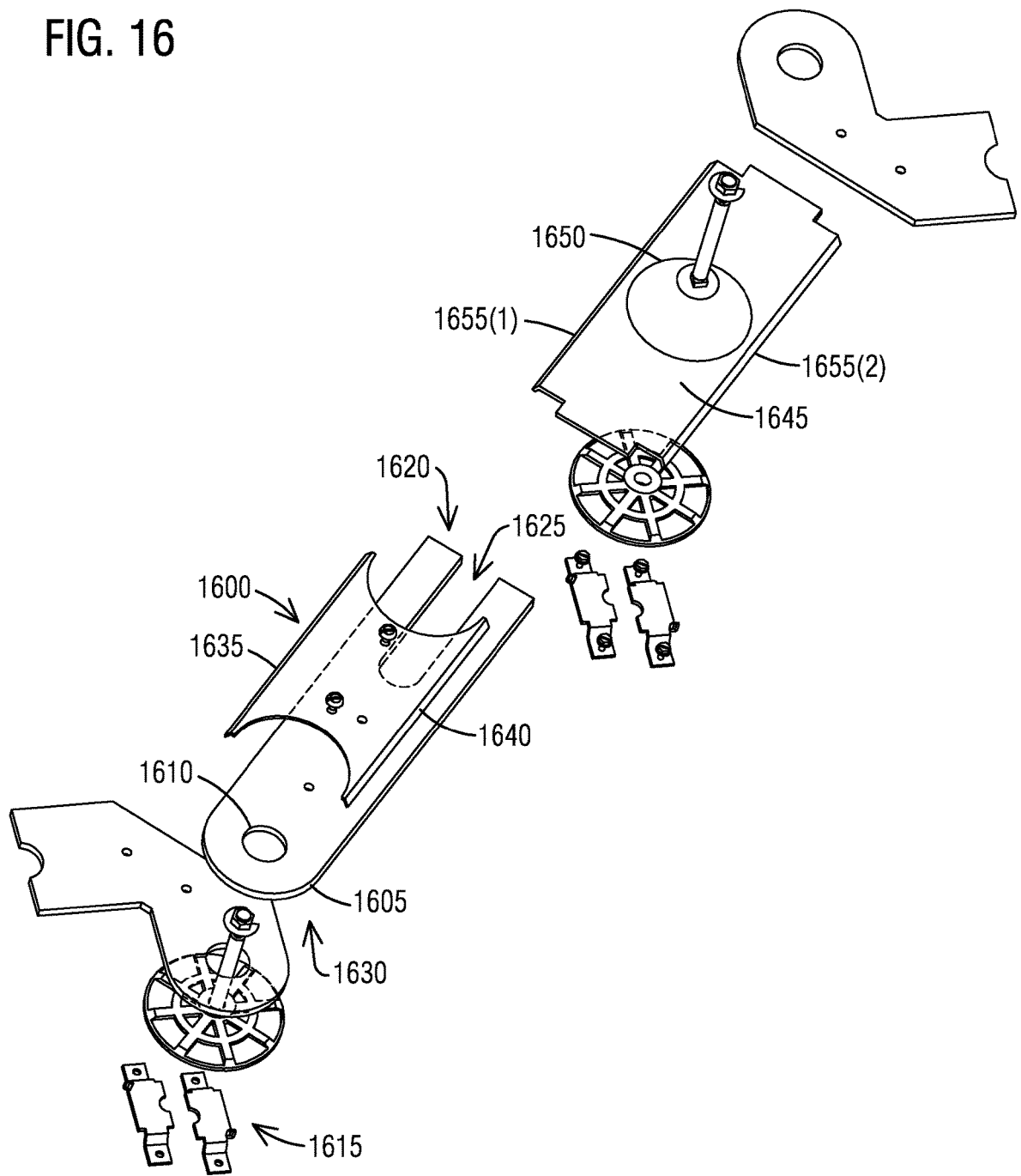
FIG. 16 illustrates an exploded view of C phase bus connections (with all other phase bus removed) in accordance with an exemplary embodiment of the present invention.

FIG. 16 illustrates an exploded view of C phase bus connections (with all other phase bus removed) in accordance with an exemplary embodiment of the present invention. A phase jumper bus bar 1600 has round edges 1605 and a concentric hole 1610 at a bottom end 1615. The concentric hole 1610 is intended to loosely fit in a cylinder extrusion on a plastic disk, so that the phase jumper bus bar 1600 can rotate around the center line of the disks. A top portion 1620 of the phase jumper bus bar 1600 has a slot 1625 with the same width as the diameter of the concentric hole 1610 at a lower portion 1630. The slot 1625 defines a guide having two parallel arms. The slot 1625 fits in the cylinder extrusion on the plastic disk of the top disk connection 1415(2). When the connection is loosened, the phase jumper bus bar 1600 can slide along the slot 1625. A C phase insulator 1635 that has half circle cutoffs at each end, is attached to a C phase jumper 1640 by two plastic screws, so that the insulator 1635 can move with the C phase jumper 1640. Another rectangular insulator 1645 has a big hole 1650 at the center and flanges 1655(1-2) on sides. The big hole 1650 fits loosely to a top disk, so that the insulator 1635 can stay around the top disk connection 1415(2) and follow the angle of the phase jumper bus bar 1600 with the side flanges fitting around the sides of the C phase jumper 1640.

Figure 17:
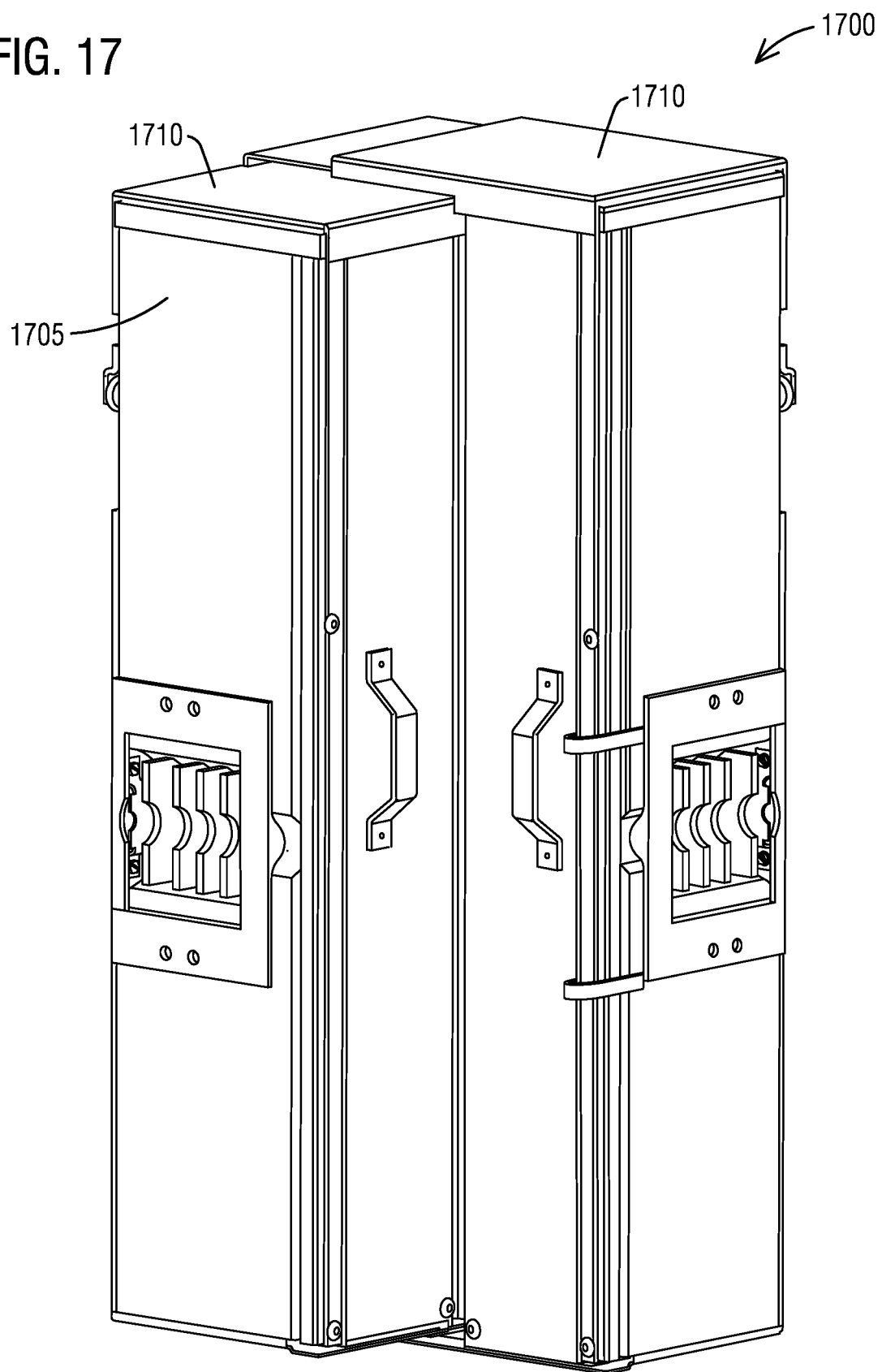
FIG. 17 illustrates a perspective view of an expandable modular bused elbow in accordance with an exemplary embodiment of the present invention.

FIG. 17 illustrates a perspective view of an expandable bused elbow 1700 in accordance with an exemplary embodiment of the present invention. The expandable bused elbow 1700 is for connecting modular metering equipment around an inside corner. Like the expandable bused spacer 10, the expandable bused elbow 1700 has interfaces on both sides of an enclosure 1705 for bus and enclosure connections. The expandable bused elbow 1700 has a left side, a right side, a top, a bottom, a left back, a center (chamfer) back, and right back sides. It also has a combination of covers on the left and right side that comprise three piece overlapping covers 1710(1-6).

Figure 18:
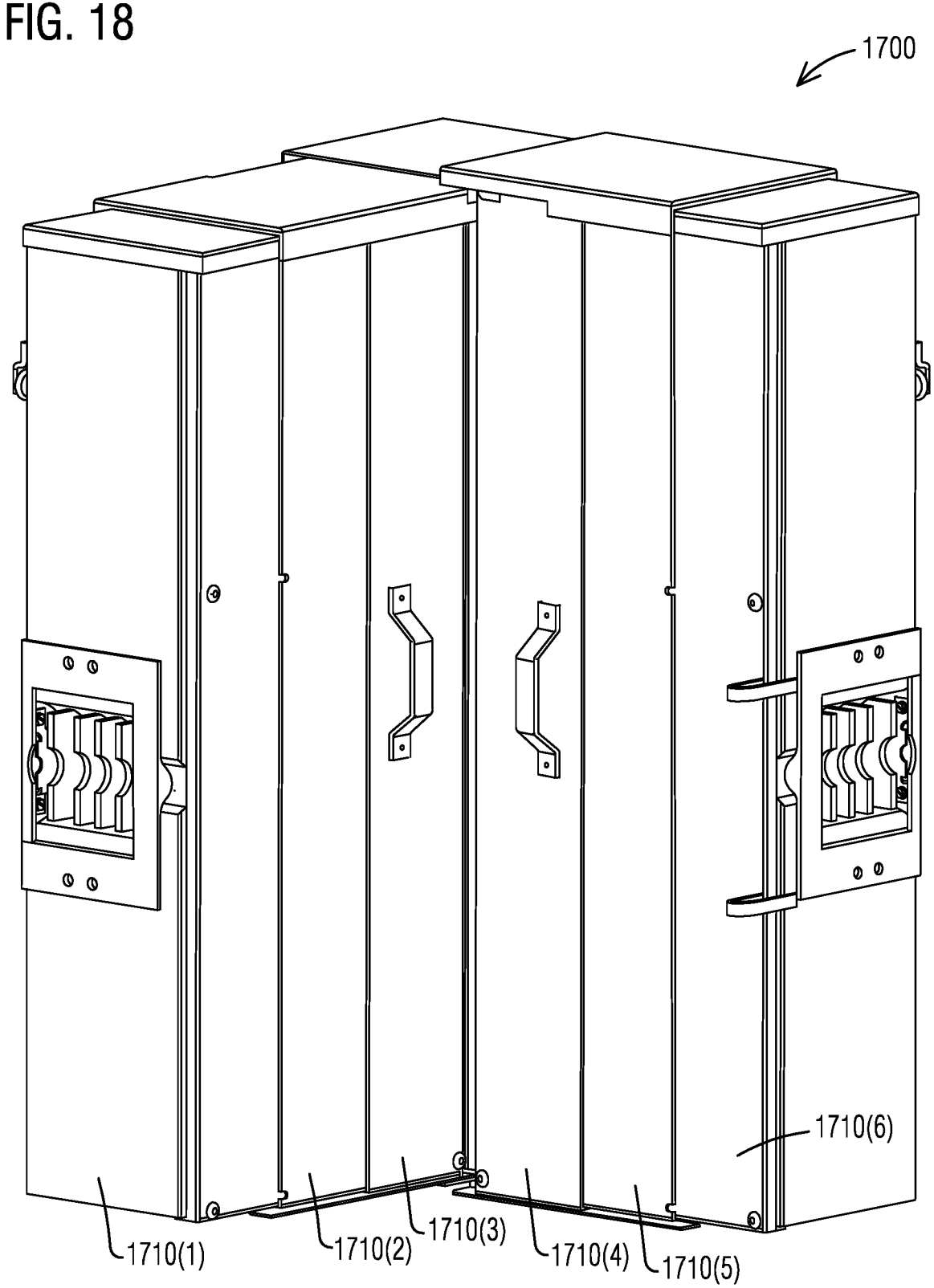
FIG. 18 illustrates shows a perspective view of expanded an expandable modular bused elbow in accordance with an exemplary embodiment of the present invention.

FIG. 18 illustrates shows a perspective view of the expanded expandable bused elbow 1700 in accordance with an exemplary embodiment of the present invention. The left and right side can be extended up to 7 inches either way independently. The three piece overlapping covers 1710(1-3) on both sides are shown in their expanded position.

Figure 19:
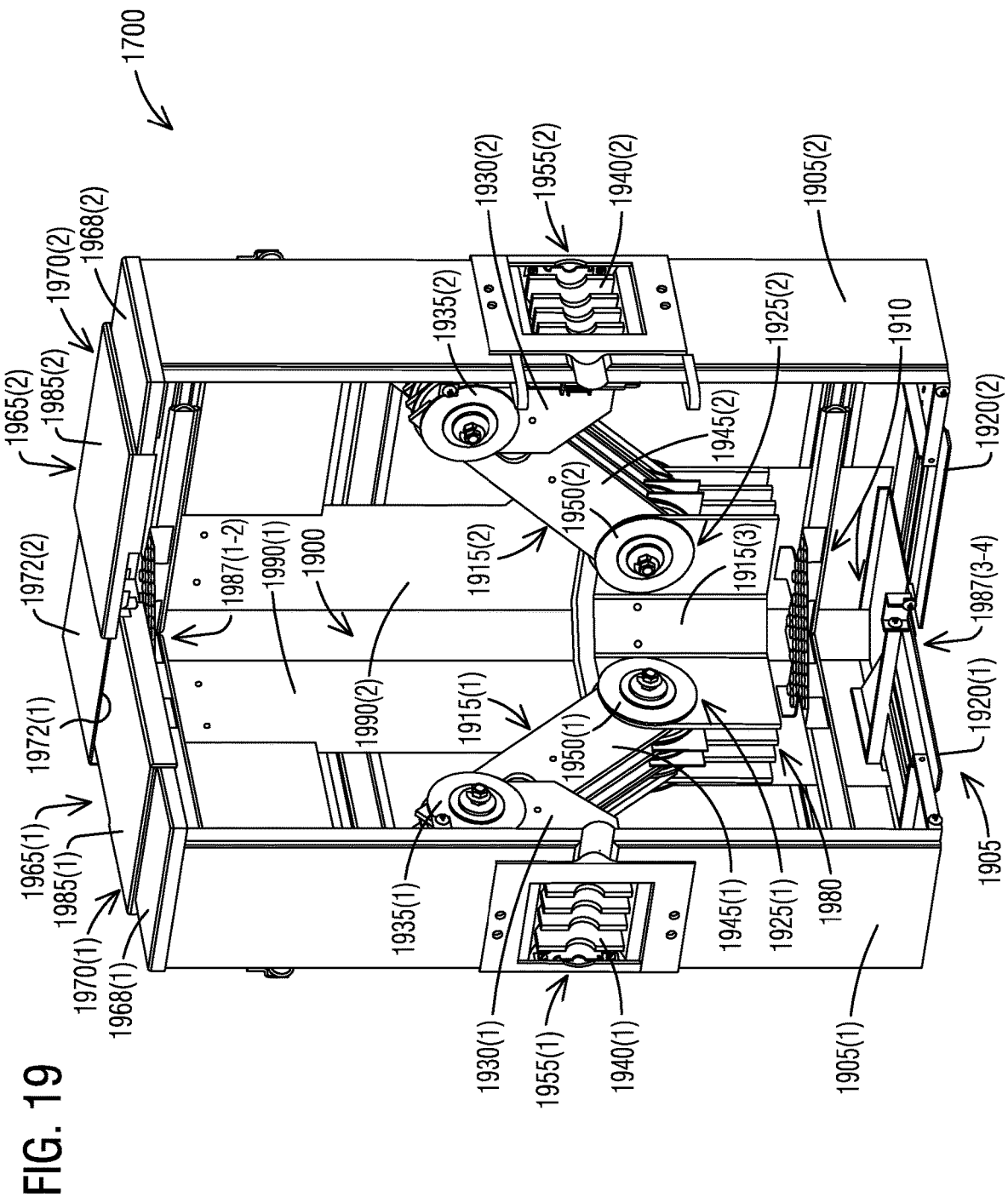
FIG. 19 illustrates the interior of expanded an expandable modular bused elbow in accordance with an exemplary embodiment of the present invention.

FIG. 19 illustrates the interior of the expanded expandable bused elbow 1700 in accordance with an exemplary embodiment of the present invention. The expandable bused elbow 1700 is like combining two expandable bused spacers together with a 90 degree angle in the middle of the enclosure. The expandable bused elbow 1700 comprises an enclosure 1900 configured to fit in a gap between modular equipment. The enclosure 1900 has a box assembly 1905 with a sliding mechanism 1910 that enables expansion of the box assembly 1905. The box assembly 1905 includes a left box assembly 1905(1) and a right box assembly 1905(2).

The expandable bused elbow 1700 further comprises a first bussed interior assembly 1915(1) enclosed within the enclosure 1900 having a first bottom end 1920(1). The first bussed interior assembly 1915(1) has a first bussing expansion mechanism 1925(1) that enables expansion of the first bussed interior assembly 1915(1). The expandable bused elbow 1700 further comprises a second bussed interior assembly 1915(2) enclosed within the enclosure 1900 having a second bottom end 1920(2). The second bussed interior assembly 1915(2) has a second bussing expansion mechanism 1925(2) that enables expansion of the second bussed interior assembly 1915(2). The expandable bused elbow 1700 further comprises a center corner assembly 1915(3) disposed in a middle space between the first bussed interior assembly 1915(1) and the second bussed interior assembly 1915(2) such that the center corner assembly 1915(3) is coupled to the first bottom end 1920(1) of the first bussed interior assembly 1915(1) on one end and to the second bottom end 1920(2) of the second bussed interior assembly 1915(2) on other end.

The first bussed interior assembly 1915(1) further comprises a left phase bus bar 1930(1) disposed between a first top disk connector 1935(1) and a left insulator 1940(1). The first bussed interior assembly 1915(1) further comprises a first jumper bus bar 1945(1) disposed between a first bottom disk connector 1950(1) and the first top disk connector 1935(1). The second bussed interior assembly 1915(2) further comprises a right phase bus bar 1930(2) disposed between a second top disk connector 1935(2) and a right insulator 1940(2). The second bussed interior assembly 1915(2) further comprises a second jumper bus bar 1945(2) disposed between a second bottom disk connector 1950(2) and the second top disk connector 1935(2). The left insulator 1940(1) further comprises a first cavity 1955(1) for a left bus opening to receive a left quick connect disk coupler (not shown). The right insulator 1940(2) further comprises a second cavity 1955(2) for a right bus opening to receive a right quick connect disk coupler (not shown).

The expandable bused elbow 1700 further comprises the left box assembly 1905(1) further comprises a left cover assembly 1965(1) including a first cover 1968(1), a second cover 1970(1) and a third cover 1972(1). The first cover 1968(1), the second cover 1970(1) and the third cover 1972(1) are configured in a first telescopic mechanism 1975(1) so that the left cover assembly 1965(1) can slide open or slide close.

Likewise, the expandable bused elbow 1700 further comprises the right box assembly 1905(2) further comprises a right cover assembly 1965(2) including a first cover 1968 (2), a second cover 1970(2) and a third cover 1972(2). The first cover 1968(2), the second cover 1970(2) and the third cover 1972(2) are configured in a second telescopic mechanism 1975(2) so that the right cover assembly 1965(2) can slide open or slide close.

A center stack of bus bars 1980 is mounted on the center corner assembly 1915(3) and remains stationary. The left phase bus bar 1930(1) is mounted in the left box assembly 1905(1) that can slide apart from the center corner assembly 1915(3). Similarly, the right box assembly can also slide away from the center corner assembly 1915(3). The first and second phase jumper bus bars 1945(1-2) make the connection between the bottom disk connections to the top disk connections of the left and right box assemblies 1905(1-2). A left wrapper 1985(1) is installed between the left box assembly 1905(1) and the center corner assembly 1915(3). A right wrapper 1985(2) is installed between the right box assembly 1905(2) and the center corner assembly 1015(3). The left and right wrappers 1985(1-2) fill the gaps when the left and/or right box assembly 1905(1, 2) has been moved to its extended position.

There are two sets of sliding mechanism 1987(1-4) mounted on a top and a bottom portion of back walls 1990(1-2) on the left and right box assemblies 1905(1-2) to assist in their adjustments. Between the top end walls and top walls of the left and right wrappers 1985(1-2), similar to those in the expandable bused spacer 10, the bracket and rivet combinations are used to define the closest and furthest limits of the enclosure width adjustment. The same bracket and rivet combinations are installed between the bottom end walls and the bottom walls of the left and right wrappers 1985(1-2) for movement stability.

Figure 20:
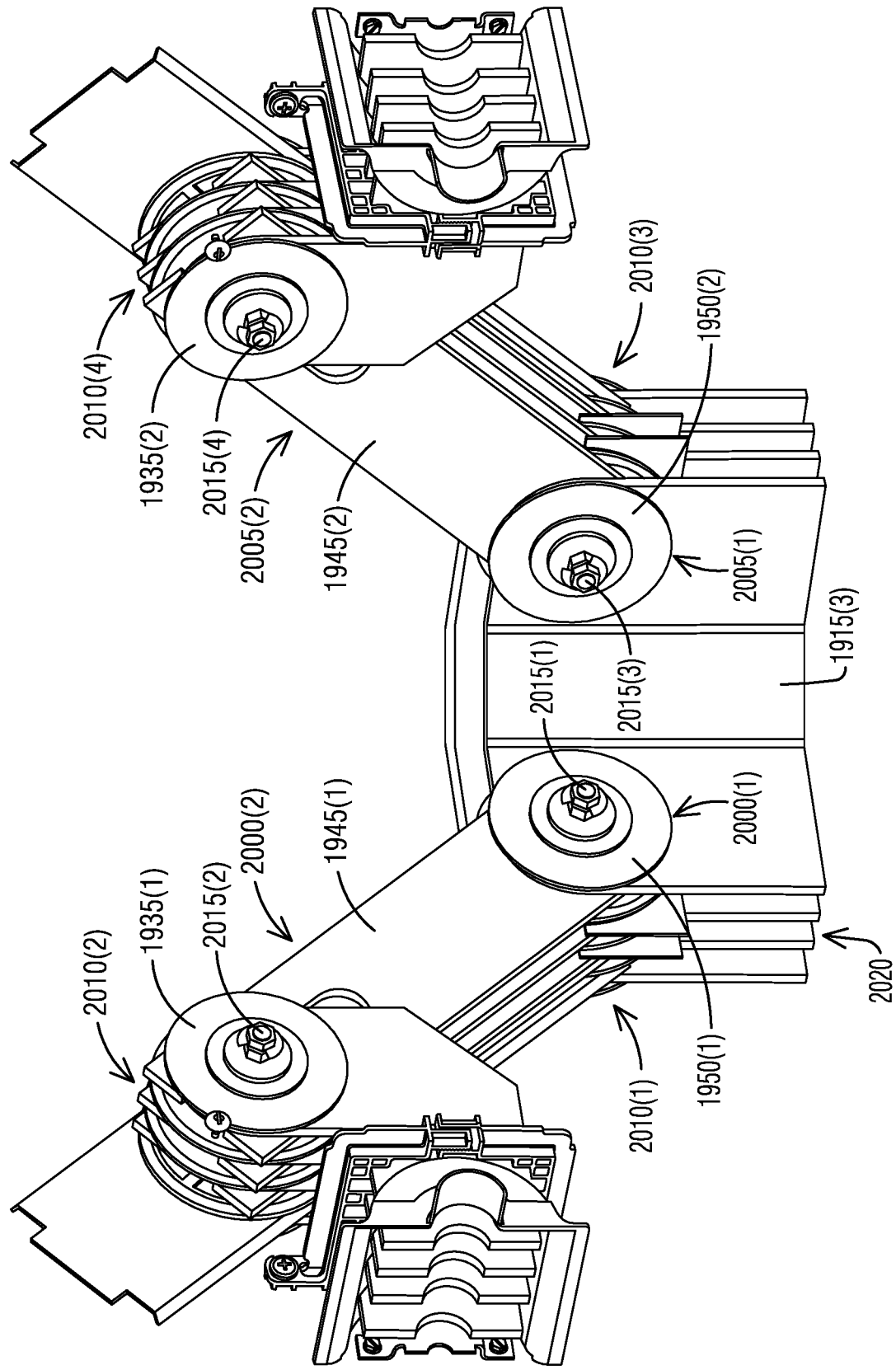
FIG. 20 illustrates the interior bus structure of expanded an expandable modular bused elbow in accordance with an exemplary embodiment of the present invention.

FIG. 20 illustrates the interior bus structure of an expanded expandable bused elbow 1700 in accordance with an exemplary embodiment of the present invention. The first jumper bus bar 1945(1) further comprises a first end 2000(1) with a round edge and a concentric hole. The first jumper bus bar 1945(1) further comprises a second end 2000(2) with a guide having two parallel arms. The second jumper bus bar 1945(2) further comprises a first end 2005(1) with a round edge and a concentric hole. The second jumper bus bar 1945(2) further comprises a second end 2005(2) with a guide having two parallel arms.

The first bottom disk connector 1950(1) further comprises a first stack of insulator disks 2010(1) holding a C bus, a B bus, a N bus and an A bus with a first carriage bolt 2015(1) and a first pair of brackets. The first top disk connector 1935(1) further comprises a second stack of insulator disks 2010(2) holding the C bus, the B bus, the N bus and the A bus with a second carriage bolt 2015(2) and a second pair of brackets. The second bottom disk connector 1950(2) further comprises a first stack of insulator disks 2010(3) holding a C bus, a B bus, a N bus and an A bus with a first carriage bolt 2015(3) and a first pair of brackets. The second top disk connector 1935(2) further comprises a second stack of insulator disks 2010(4) holding the C bus, the B bus, the N bus and the A bus with a second carriage bolt 2015(4) and a second pair of brackets.

The center corner assembly 1915(3) of FIG. 19 comprises a plurality of center phase bus bars 2020 that are bent 90 degrees with a 45 degree chamfer in the middle. The top corners of the center phase bus bars 2020 have rounded edges that contour the insulating disk. There are holes that are concentric to the rounded edges that fit over the cylindrical protrusion on the insulating disks. The center phase bus bars 2020 are properly spaced by stacking together in the two bottom disk connections and anchored to the center corner assembly 1915(3) through the bolts at the center of the disk connections. The phase jumpers pivot at the bottom disk connections and connect to the left and right top disk connections. The mechanism of left and right phase bus, supports and disk connections are same as described in FIGS. 10, 14, 15, etc.

While the expandable bused spacer 10 and the expandable bused elbow 1700 are described here as means to fill gaps in between modular metering equipment other constructions of expandable bused systems are also contemplated by the present invention. For example, a vertical or stacked system may be implemented based on one or more features presented above for horizontal systems without deviating from the spirit of the present invention.

A "spacer" or an "elbow" is defined as a device used for installing Modular Metering Equipment to fill gaps between electrical modules in an electrical room. These are installed when each module needs additional two or three inches installation space to lie in an additional module, when the modules are connected. These spacers or the elbows are smaller enough to fit in tight space and yet are capable of making electrical connections. These spacers or the elbows can be used the Modular Metering Equipment needs to go around inside or outside corners. The spacers or the elbows are to be used when the Modular Metering Equipment has to be joined together correctly with snug electrical connections.

The techniques described herein can be particularly useful for the C bus, the B bus, the N bus and the A bus architecture. While particular embodiments are described in terms of this bus layout, the techniques described herein are not limited to the C bus, the B bus, the N bus and the A bus but can also be used for other bus designs.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

In the foregoing specification, the invention has been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the drawings/figures can also be implemented in a more separated or integrated manner, or even removed or rendered as inoperable in certain cases, as is useful in accordance with a particular application.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. An expandable bused spacer for modular metering, the expandable bused spacer comprising:
    an enclosure configured to fit in a gap between modular equipment, the enclosure having a box assembly with a sliding mechanism that enables expansion of the box assembly; and
    a bussed interior assembly enclosed within the enclosure, the bussed interior assembly having a bussing expansion mechanism that enables expansion of the bussed interior assembly, wherein the bussed interior assembly further comprises:
        a left phase bus bar disposed between a bottom disk connector and a left insulator,
        a right phase bus bar disposed between a top disk connector and a right insulator, and
        a jumper bus bar disposed between the bottom disk connector and the top disk connector.

2. The expandable bused spacer of claim 1, wherein the box assembly further comprising:
    a first cover;
    a second cover; and
    a middle wrapper disposed over at least a portion of the first cover and at least a portion of the second cover, the middle wrapper slidingly engages with the first cover and the second cover to slide open or slide close the box assembly.

3. The expandable bused spacer of claim 1, wherein the jumper bus bar further comprising:
    a first end with a round edge and a concentric hole; and
    a second end with a guide having two parallel arms.

4. The expandable bused spacer of claim 3, wherein the top disk connector is configured to translate from one position or another position by traveling over the guide of the jumper bus bar so that the expandable bused spacer can expand from 10" wide to 17" wide.

5. The expandable bused spacer of claim 1, wherein the bottom disk connector further comprising:
   a first stack of insulator disks holding a C bus, a B bus, a N bus and an A bus with a first carriage bolt and a first pair of brackets.

6. The expandable bused spacer of claim 5, wherein the top disk connector further comprising:
   a second stack of insulator disks holding the C bus, the B bus, the N bus and the A bus with a second carriage bolt and a second pair of brackets.

7. The expandable bused spacer of claim 1, wherein the left insulator further comprising:
   a first cavity for a left bus opening to receive a left quick connect disk coupler.

8. The expandable bused spacer of claim 7, wherein the right insulator further comprising:
   a second cavity for a right bus opening to receive a right quick connect disk coupler.

9. The expandable bused spacer of claim 1, wherein the bottom disk connector pivots the jumper bus bar so that the jumper bus bar rotates from one position or another position such that the expandable bused spacer can expand from 10" wide to 17" wide.

* * * * *